US009258643B2

(12) United States Patent
Schiffelers et al.

(10) Patent No.: US 9,258,643 B2

(45) Date of Patent: Feb. 9, 2016

(54) SYSTEM FOR BLENDING SIGNALS

(71) Applicant: NXP B.V., Eindhoven (NL)

(72) Inventors: Ronald Hubertus Bernardus Schiffelers, Malden (NL); Temujin Gautama, Boutersem (BE); Sebastian Schreuder, Hamburg (DE)

(73) Assignee: NXP B.V., Eindhoven (NL)

( * ) Notice: Subject to any disclaimer, the term of this patent is extended or adjusted under 35 U.S.C. 154(b) by 162 days.

(21) Appl. No.: 14/133,186

(22) Filed: Dec. 18, 2013

(65) Prior Publication Data

US 2014/0169590 A1 Jun. 19, 2014

(30) Foreign Application Priority Data

Dec. 19, 2012 (EP) .................................... 12198122
Apr. 22, 2013 (EP) .................................... 13164784

(51) Int. Cl.

*H04B 3/00* (2006.01)
*H04R 3/00* (2006.01)
*H04H 20/26* (2008.01)
*H04H 20/22* (2008.01)

(52) U.S. Cl.

CPC ................ *H04R 3/00* (2013.01); *H04H 20/26* (2013.01); *H04H 20/22* (2013.01); *H04H 2201/13* (2013.01); *H04H 2201/20* (2013.01)

(58) Field of Classification Search

None
See application file for complete search history.

(56) References Cited

U.S. PATENT DOCUMENTS

| | | | | |
|---|---|---|---|---|
| 4,476,501 | A * | 10/1984 | Hirota et al. | 386/337 |
| 4,701,956 | A * | 10/1987 | Katoh | 381/61 |
| 6,178,317 | B1 | 1/2001 | Kroeger et al. | |
| 7,454,026 | B2 * | 11/2008 | Yamada | 381/310 |
| 2004/0160940 | A1 * | 8/2004 | Kim | H04W 88/181 370/349 |
| 2006/0279445 | A1 * | 12/2006 | Kinyua et al. | 341/155 |

OTHER PUBLICATIONS

Laroche, J. et al. "Improved Phase Vocoder Time-Scale Modification of Audio", IEEE Transactions on Speech and Audio Processing, vol. 7, No. 3, pp. 323-332 (May 1999).

* cited by examiner

*Primary Examiner* — Thang Tran

(57) ABSTRACT

A time modification system is disclosed. The time modification module includes a delay module for receiving an input signal comprising a series of digital samples at an input sample rate. The delay module provides a delayed output signal. The time modification module further includes a duration modification module for receiving the input signal or a delayed version thereof, and providing a modified output signal. A first switch is included for selecting either the delayed output signal or the modified output signal.

10 Claims, 3 Drawing Sheets

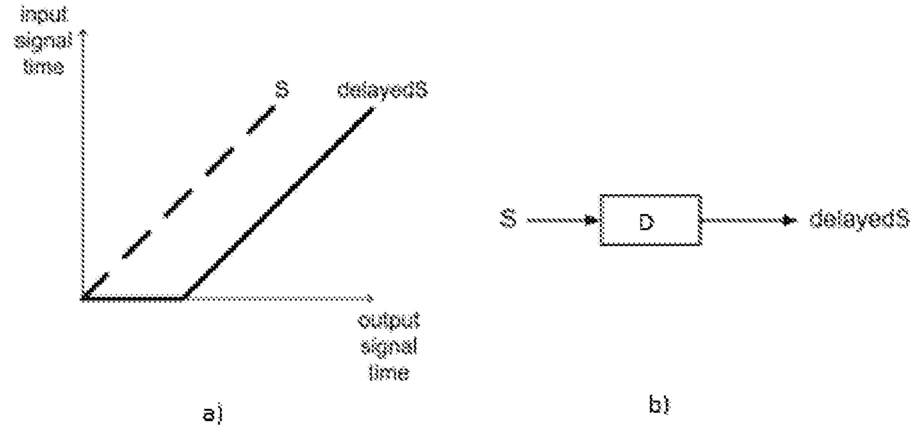
Fig. 1 Schematic representation of a delay device and operation
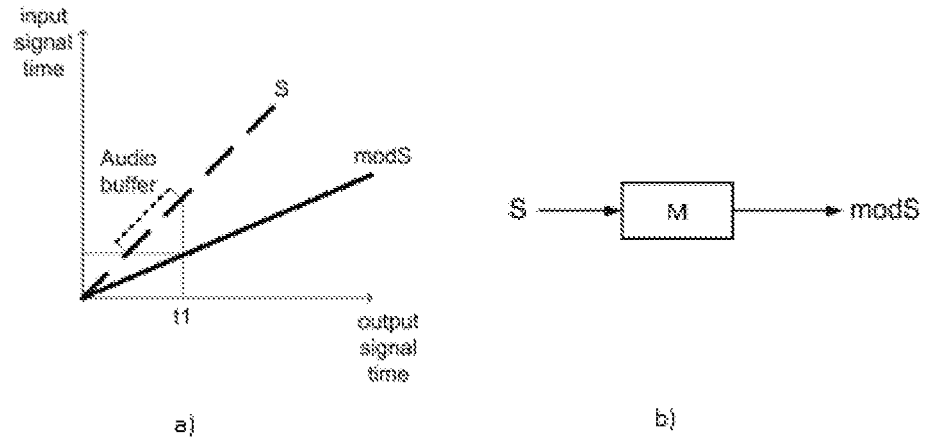
Fig. 2 Schematic representation of a time-scale modification device and operation

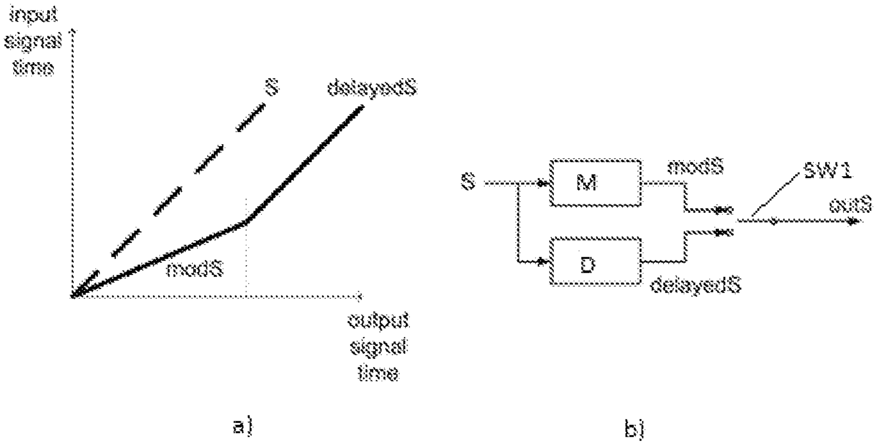
Fig. 3 Schematic representation of a time-scale modification device and operation
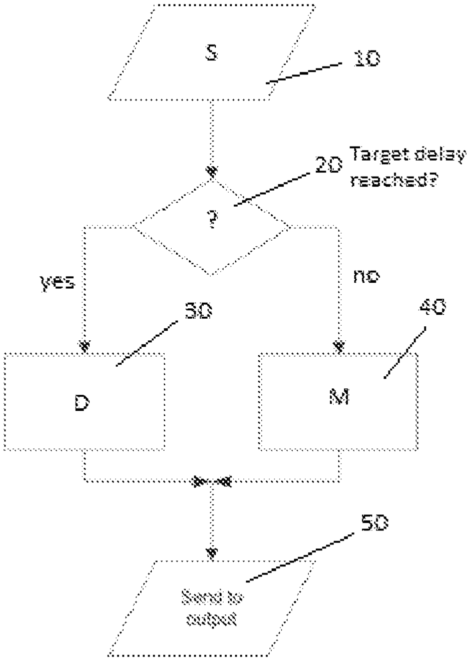
Fig. 4 The blending process

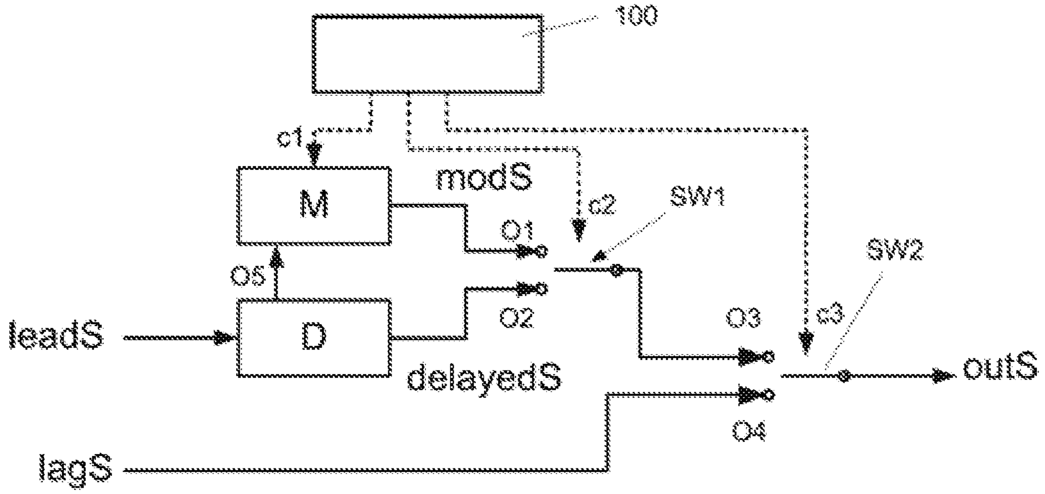
Fig. 5 A system with blending

SYSTEM FOR BLENDING SIGNALS

CROSS-REFERENCE TO RELATED APPLICATIONS

This application claims the priority under 35 U.S.C. §119 of European patent application no. 13164784.4, filed on Apr. 22, 2013 and European patent application no. 12198122.9 filed Dec. 19, 2012, the contents of which are incorporated by reference herein.

FIELD OF THE INVENTION

The invention relates to the field of digital signal processing and particularly to blending the samples of a digitized signal and particularly it relates to audio signals.

The digital transmission broadcasts multiplied lately both for radio and video applications. However, they coexist with the classical analog broadcasting stations which transmit analog broadcast. It is often the case in audio signal transmissions that the same content is transmitted by different broadcasters, possibly using different radio standards (such as AM, FM, DAB, etc.). As an example, many radio stations that transmit digital radio also transmit the same program in an analog manner i.e. AM or FM. For the In-Band-On-Channel (IBOC) HD Radio™ system, the digital and analog broadcasts are centered on the same frequency, while for the Eureka 147 Digital Audio Broadcasting (DAB) system the transmission of the digital radio program is on a different frequency than the corresponding analog FM or AM ones. The audio signals which are available from different transmission stations may not be time-aligned, due to different delays through the different aerial paths different types of processing, and buffering in the digital standards. For example, the audio signal coming from a DAB broadcast lags behind that coming from an FM broadcast.

When two broadcasts for the same radio program are available as a digital and an analog audio broadcasts, or two digital broadcasts of the same program, it is possible for the receiver to switch from one broadcast to the other, when the reception of one is worse than that of the other. Examples of such phenomena, often referred to as blending, are described in Kroeger and Stehlik, January 2001. System and Method for Mitigating Intermittent Interruptions in an Audio Radio Broadcast System, U.S. Pat. No. 6,178,317.

Hence, it is important that the two signals are aligned properly in time, such that the transition from one signal to the other is as seamless as possible. The delay between the two signals can be determined during playback, in which case the time delay is found by determining the peak in the cross-correlation function between two segments of the signals while one of the audio signals is playing, or it can be predetermined, and the signal that is available first, the 'leading' signal, can be delayed appropriately, so that the two signals become time-aligned.

When a radio is switched on, and it is able to receive several broadcasts simultaneously, it is possible that the audio signal from one of the broadcasts is available earlier than the other (s). To minimize the start-up time, i.e. the time interval between switching on the radio and hearing audio playback from the radio, the leading audio signal should be chosen for playback. When the leading audio signal is played without adding a delay line, switching to another signal i.e. a lagging audio signal, may cause audible artifacts.

It is also possible that several broadcasts are received simultaneously, a delayed version of one of which is being played i.e. the signal is delayed such that it is time-aligned to a second broadcast. It may be required to change the length of the delay: when, e.g., the delay of the second broadcast changes, the delay of the first broadcast signal may be adapted to become time-aligned again with the second one. The length of the delay buffer may be required to increase or decrease.

The audio signals can be obtained from an analog transmission standard such as AM or FM, or it can be obtained from a digital transmission standard such as DAB. In the first case, the signal is converted to the digital domain using an analog-to-digital converter. For the remainder of this application the signals are assumed to be digital i.e. they are series of digital sample values.

The leading signal is not necessarily the preferred one from the audio quality or other perspective, and it may be desirable to use another signal as the default one for playback i.e. the preferred signal. This would lead to a silent period during which the preferred audio signal is not available yet, which increases the start-up time. Another scenario where you would want to switch from a leading audio to the alternative audio service with the same content that may be lagging behind would be when the reception degrades and your alternative, be it a digital or an analog one, has a better reception quality. This could happen quite often when the radio is mounted on a moving vehicle such as a car.

When the playback of the leading audio signal is used, and the preferred audio signal is one arriving later than the leading one, it is not possible to switch from the leading audio signal i.e. the signal guaranteeing the shortest start-up time, to the preferred audio signal without an audible transition due to the delay between the two audio signals. Clearly, start-up time i.e. the time necessary from switching on the radio till the first samples of the audio signal are heard and playing the preferred signal could be conflicting requirements.

Usually, when the above-mentioned situation occurs one may use either a delay line or a time-scale modification module. FIG. 1*b*) shows a delay line representation. The input signal, S, is delayed by a fixed number of samples and the output is a delayed version, delayedS of the input signal. The delay may be implemented using a shift register but other possibilities are available, too. The module consists of a first-in-first-out (FIFO) buffer of audio samples. FIG. 1*a*) depicts a graphical representation of this operation. The horizontal axis denotes the output signal time. This is the actual playback time. The vertical axis denotes the input signal time, which is the position in the input signal used for generating the output signal. The dashed line represents an instantaneous playback of the input signal, S, which is a line having a 45° slope and which passes through the origin. The output of the delay line is represented by the solid curve. As we have already mentioned, the delay can be implemented in HW as a shift register, the length of which determines the length of the implemented delay in audio samples. The output signal time remains inaudible i.e. having almost zero amplitude for a time during which there is no audio output i.e. defining a silent period. After this silent period, the output signal increases linearly with the same 45° slope as the instantaneous playback.

FIG. 2*b*) shows a time-scale modification module receiving an input signal S, and providing an output signal modS. Time-scale modification is an operation that changes the duration of the input signal while retaining most of the spectral characteristics such as the pitch. Time-scale modification refers to an extension or compression of the duration of the input signal i.e. for one second of input audio, more or less than one second of audio is output. To be able to play the input S at a lower time scale i.e. a longer duration, an audio buffer needs to be maintained containing the samples that have not yet been sent to the output. This buffer becomes longer i.e. by providing a longer register, as time progresses. This is shown with the dashed line in FIG. 2*a*) labeled "Audio buffer" at a given time instant t1. As an example, a re-sampling operation is considered, which re-samples the signal to a higher sampling rate say from fs1 to fs2. In this way, for B input samples, B*fs2/fs1 samples are generated. B samples are sent to the output and B*(1−fs2/fs1) samples are added to the audio buffer. When the input S is played at a higher time scale, i.e., a shorter duration, an existing audio buffer can be progressively depleted, and the buffer becomes shorter. An overview of time-scale modification algorithms can be found in Laroche and Dolson, 1999, "Improved phase vocoder time-scale modification of audio", IEEE Trans. Speech and Audio Processing 7 (3), 323-332.

FIG. 2*a*) depicts this operation. Again, the dashed line represents the instantaneous playback and the solid curve represents the time-scale modification operation. The playback starts immediately i.e. the line passes through the origin, but has a smaller slope than that of the instantaneous playback. Therefore, at any moment in time, the portion of the input signal that has been processed and sent to the output is smaller than would have been the case for the instantaneous playback.

SUMMARY OF THE INVENTION

Hence, there is a need for a system that reduces the above mentioned disadvantages that appear in the reception of digital or digitized signals.

It is therefore an object of the invention to change the time delay between two broadcasts during playback, e.g., to minimize the start-up time of a radio, still maintaining the possibility to switch to the preferred audio signal after an initial transition period.

This object is achieved in a time modification system comprising

- a delay module for receiving an input signal comprising a series of digital samples at an input sample rate, the delay module providing a delayed output signal;
- a duration modification module for receiving the input signal and providing a modified output signal;
- a first switch for selecting either the delayed output signal or the modified output signal.

It is possible to change the length of an existing buffer i.e. making it longer or shorter. This may be applied to minimize the start-up time of a radio, still maintaining the possibility to switch to the preferred audio signal after an initial transition period. Additionally, it may be used to adjust the time-alignment between the signals from the different broadcasts, in which case the delay may be required to increase or decrease.

In an embodiment, the input to the duration modification module consists of the input audio signal.

In another embodiment, the input to the duration modification module consists of a delayed version of the input audio signal, which may reuse the delay buffer already in place. This way, the delay buffer is used to generate two versions of the input signal, with different delays.

In an embodiment, the duration modification module is adapted to change the duration of the input signal and to maintain input signal spectral characteristics.

Additionally, in another embodiment, the duration modification module is adapted to re-sample the input signal to a lower sample rate than the rate of the input signal. Preferably the input signal is an audio signal.

In yet another embodiment, the time modification system is used in a system for blending signals comprising

- a time modification system as claimed in any preceding claims adapted to receive a first input signal and providing a time-modified output signal,
- a second switch adapted to select either the modified output signal or a second input signal and to provide an output blended signal.

The system for blending signals may further comprise a control unit adapted to provide a first control signal for controlling the duration modification module, a second control signal for controlling the first switch, and a third control signal for controlling the second switch.

In another embodiment of the invention it is provided a method for time modifying an input signal comprising a series of digital samples, the method comprising steps of

- delaying the input signal and providing a delayed output signal,
- time-modifying the input signal and providing a modified output signal;
- determining if a target delay has been reached; and
- selecting either the delayed output signal or the modified output signal and transmitting it as an output.

The method may further comprising the steps of

- receiving a second signal,
- providing a second control signal for selecting either a time-modified output signal, or the second signal.

The system for blending the audio signals may be included in a receiver and may be used in a car radio, for example.

The invention is defined by the independent claims. Dependent claims define advantageous embodiments.

BRIEF DESCRIPTION OF THE DRAWINGS

The above and other advantages will be apparent from the exemplary description of the accompanying drawings in which FIG. 1*a*) depicts a schematic representation of a delay device operation;

FIG. 1*b*) depicts a schematic representation of a delay device;

FIG. 2*a*) depicts a schematic representation of a time-scale modification device operation;

FIG. 2*b*) depicts a schematic representation of a time-scale modification device;

FIG. 3*a*) depicts a schematic representation of a time-scale modification device operation, according to the invention;

FIG. 3*b*) depicts a schematic representation of a time-scale modification device, according to the invention;

FIG. 4 depicts a blending process according to the invention; and

FIG. 5 depicts a system with blending, according to the invention.

DETAILED DESCRIPTION OF EMBODIMENTS

The application describes both a method and system that may be used whenever two signals, for example two audio signals, are available and have approximately the same audio content, but do not arrive simultaneously and may have different encoding and/or noise artifacts. A delay is necessary to synchronize the audio signals. This information is usually known by the radio application, which may store a list of the channels with their corresponding frequencies. A target delay is assumed to be known and it may be known from prior off-line measurements, or it may be estimated on-line, e.g., by determining the peak in the cross-correlation function between the two signals. We define a leading signal as being the signal which is available first. If the preferred (or target)

signal is a second i.e. lagging signal, the system according to the present application starts with a playback from the leading signal, but with a modified duration which is passed through a time-scale modification module or a re-sampling module, and switches to a delayed version when the target delay, the delay between the leading audio signal and the target audio signal, has been reached i.e. when the length of the internal audio buffer of the duration modification module is equal to the target delay. After this switching, it is possible to switch to the target audio signal the delayed version of the leading signal will be time aligned to the target signal.

The system described here uses a "duration modification" module, which is either a time-scale modification module, which changes the duration of the input audio signal while retaining most of the spectral characteristics, or a re-sampling module, which re-samples the input audio signal to a lower sampling rate but plays the output samples as if the sampling rate has not changed, thereby changing the spectral characteristics, such as the pitch of the input signal.

FIGS. 3a) and 3b) depict a schematic representation of a time-scale modification device operation, according to the invention and a schematic representation of a time-scale modification device, respectively.

In FIG. 3b) the input signal, S, which can be single- or multi-channel, is fed into an upper branch consisting of a duration modification module with 10 output modS, and into a lower branch consisting of a delay line with output delayedS. The output, outS, is selected to be either modS before the target delay has been reached or delayedS if the target delay has been reached. This operation is shown in FIG. 3a), wherein the dashed line represents the instantaneous playback, and the solid curve represents the output, outS, of the proposed module. Initially, the playback is slower than in the instantaneous playback case, and hence, the slope is smaller than that of the instantaneous playback. When the target delay is reached, the playback rate is restored to the original playback rate, due to which the curve again has the same slope as that of the instantaneous playback. When the output, outS, is chosen from the lower branch, i.e. when the target delay is reached and outS corresponds to delayedS, the output is time-aligned to the target signal and the transition to the target signal can be made.

The duration modification module can have a fixed ratio between the length of the input frame and that of the output frame, or it can be variable. In the latter case, it may for example decrease as a function of the delay that still needs to be bridged, so that the ratio is largest at startup and decreases to zero when the target delay has been reached.

Briefly, the time modification system comprises a delay module D for receiving an input signal S comprising a series of digital samples at an input sample rate, the delay module D providing a delayed output signal delayedS. It further comprises a duration modification module M for receiving the input signal S and for providing a modified output signal modS. The module also comprises a first switch SW1 for selecting either the delayed output signal delayedS or the modified output signal modS. It is supposed that the system comprises a target delay comparator indicating whether the delay has reached the target delay or not. The comparator has not been explicitly shown in the Figures being a known component for the skilled person in the art.

The duration modification module M may be adapted to change the duration of the input signal S and to maintain input signal spectral characteristics. The duration modification module M may be adapted to re-sample the input signal S to a lower sample rate than the rate of the input signal S.

The input signal S may be an audio signal, but it could be any signal comprising a sequence of samples.

FIG. 4 depicts a blending process according to the invention. The flowchart depicted in FIG. 4 depicts the process attached to the system depicted in FIG. 3 and it is self-explanatory. At step 10, the target signal S is fed an upper branch consisting of a duration modification module with output modS, and into a lower branch consisting of a delay line with output delayedS. At decision step 20, it is determined if the target delay has been reached. If the target delay has been reached, at step 30, delayed (D) is selected. If no, at step 40, modS is selected. At step 50, the selected signal is sent as the output.

FIG. 5 depicts a system with blending, according to an embodiment of the invention. There are provided two input signals, leadS and lagS. The leading signal is passed through a first delay line and fed into the time duration modification module with output modS in a first branch, and through a second, fixed delay line module with output delayedS, in another branch. The delay value of the first delay line is either zero, e.g., at start-up, or a positive number of samples, e.g., corresponding to the delay that was required before a possible change in delay. Let us note that the same delay buffer is used for delaying a signal with two different delays. The delay of the second delay line is set such that it synchronizes delayedS and lagS. The time duration modification module is controlled by control signal c1 from a control unit 100. A second switch SW2 can connect either modS or delayedS and connects the delayedS when the target delay has been reached. This switch is controlled by control signal c2 from the control module 100. When the target delay has been reached, the decision may be made to switch from delayedS to lagS. This switch is controlled by control signal c3 from the control unit, and may be initiated by a user request or may be done automatically. The output of the system is outS. When the target delay has not been reached yet, it corresponds to modS, and if the target delay has been reached, it is either delayedS or lagS, depending on control signal c3 from the control unit 100.

Briefly, a system is described for blending signals comprising a time modification adapted to receive a first input signal (leadS) and providing a time-modified output signal (O3), a second switch SW2 adapted to select either the modified output signal (O3) or a second input signal (lagS) and to provide an output blended signal (outS).

The system for blending signals may further comprise a control unit 100 adapted to provide a first control signal c1 for controlling the duration modification module M, a second control signal c2 for controlling the first switch SW1, and a third control signal c3 for controlling the second switch SW2.

The proposed application may be implemented as a software module. It requires inter alia the following components:

- at least two audio signals, the first of which is the 'leading' audio signal
- a FIFO register for delaying the leading audio signal,
- a possibility to modify the duration of the leading audio signal, or a delayed version thereof, as e.g. modifying the sample rate,
- a switch from the output of the delay line to the output of the duration modification module.

The present application may be used in hybrid radios, where, e.g., both an FM and a DAB broadcast are available, resulting in a leading FM audio signal and a preferred DAB audio signal. In current radios, it takes several seconds before the DAB audio signal is available, and there is no audio output during this start-up time. The proposed invention may start audio playback as soon as the leading FM audio signal is available. The proposed invention may fill or deplete an existing delay buffer to adjust the time-alignment between the broadcasts.

Even more, the present application is suitable to be implemented in car radios because the position of the car often changes and the receiving signals are changing direction accordingly.

It is remarked that the scope of protection of the invention is not restricted to the embodiments described herein. Neither is the scope of protection of the invention restricted by the reference numerals in the claims. The word "comprising" does not exclude other parts than those mentioned in the claims. The word "a(n)" preceding an element does not exclude a plurality of those elements. Means forming part of the invention may both be implemented in the form of dedicated hardware or in the form of a programmed purpose processor. The invention resides in each new feature or combination of features.

The invention claimed is:

1. A time modification system comprising:

a delay module for receiving an input signal comprising a series of digital samples at an input sample rate, the delay module providing a delayed output signal;

a duration modification module for receiving the input signal or a delayed version thereof, and providing a modified output signal, wherein the duration modification module is configured to extend or compress the input signal using an audio buffer; and a first switch for selecting either the delayed output signal or the modified output signal based on a target delay.

2. A time modification system as claimed in claim 1, wherein the duration modification module is configured to change the duration of the input signal or a delayed version thereof, and to maintain input signal spectral characteristics.

3. A time modification system as claimed in claim 1, wherein the duration modification module is configured to re-sample the input signal or a delayed version thereof, to a lower sample rate than the rate of the input signal.

4. A time modification system as claimed in claim 1, wherein the input signal is an audio signal.

5. A system for blending signals comprising:

a time modification system as claimed in claim 1;

a second input;

a second switch configured to select either an output signal from the time modification system or the second input signal and to provide an output blended signal.

6. A system for blending signals as claimed in claim 5 further comprising a control unit configured to provide:

a first control signal for controlling the duration modification module, a second control signal for controlling the first switch, and a third control signal for controlling the second switch.

7. A method for time modifying an input signal comprising a series of digital samples, the method comprising steps of:

delaying the input signal and providing a delayed output signal, time-modifying the input signal or a delayed version thereof, providing a modified output signal wherein the time-modifying includes extension or compression of the input signal using an audio buffer;

determining if a target delay has been reached; and selecting either the delayed output signal or the modified output signal and transmitting it to an output based on a result of the determining step.

8. A method for time modifying an input signal as claimed in claim 7 further comprising the steps of:

receiving a second signal; and providing a second control signal for selecting either a time-modified output signal, or the second signal.

9. A receiver comprising a system for blending audio signals as claimed in claim 5.

10. A non-transitory computer readable media comprising programming instructions which when executed performs an operation of time modifying an input signal comprising a series of digital samples, the operation includes:

delaying the input signal and providing a delayed output signal, time-modifying the input signal or a delayed version thereof, providing a modified output signal;

determining if a target delay has been reached; and selecting either the delayed output signal or the modified output signal and transmitting it to an output based on a result of the determining step.

* * * * *